United States Patent [19]

Elleaume et al.

[11] Patent Number: 5,005,149

[45] Date of Patent: Apr. 2, 1991

[54] DIGITAL COMPUTATION INTEGRATED CIRCUIT FOR CONVOLUTION TYPE COMPUTATIONS

[75] Inventors: Philippe Elleaume, Antony; Michel Prevost, Le Plessis Robinson, both of France

[73] Assignee: Thomson CSF, Paris, France

[21] Appl. No.: 280,882

[22] Filed: Dec. 7, 1988

[30] Foreign Application Priority Data

Dec. 8, 1987 [FR] France ................... 87 17051

[51] Int. Cl.⁵ .......................................... G06F 15/336
[52] U.S. Cl. ................................................. 364/728.01
[58] Field of Search .................. 364/728.01, 728.02, 364/754, 757, 736, 726, 749

[56] References Cited

U.S. PATENT DOCUMENTS

| | | | |
|---|---|---|---|
| 4,489,393 | 12/1984 | Kawahara et al. | 364/728.01 |
| 4,750,144 | 6/1988 | Wilcox | 364/728.01 |
| 4,791,590 | 12/1988 | Ku et al. | 364/726 |
| 4,833,635 | 5/1989 | McCanny et al. | 364/728.01 |

FOREIGN PATENT DOCUMENTS

| | | |
|---|---|---|
| 219315 | 2/1985 | Fed. Rep. of Germany . |
| 2384303 | 10/1978 | France . |
| 2586312 | 2/1987 | France . |

OTHER PUBLICATIONS

Electronics, vol. 52, No. 26, Dec. 1979, pp. 109–115, New York, U.S.; L. Schirm IV "Packing a signal processor onto a single digital board": FIG. 5; p. 112, lignes 16–28.

IEE Proceedings Section A-I, vol. 130, No. 5, part F, Aug. 1983, pp. 409–416, Old Woking, Surrey, GB; C.-S. Yeh et al.: "Parallel architectures for computing cyclic convolutions".

Proceeding of the I.E.E.-F, vol. 127 No. 2, Apr. 1980, pp. 99–106; S. S. Magar et al.: "Microprogrammable arithmetic element and its applicaitons to digital signal processing".

Primary Examiner—Dale M. Shaw
Assistant Examiner—Long T. Nguyen
Attorney, Agent, or Firm—Cushman, Darby & Cushman

[57] ABSTRACT

An integrated circuit for convolution type computations of the form $$\sum_i C_i X_j,$$

where $j - i + k$, and j and k are integers and i is a natural integer, $C_i$ being complex coefficients and $X_j$ being complex or real input data, for use in digital signal processing. A plurality of cells are connected in a sequence, all receiving simultaneously the input data; the complex coefficients are subsequently sent on a propagation bus to a cell first in the sequence of connected cells. Each cell includes a multiplier, and an adder accumulator, and a transfer circuit for transferring received coefficients to the next cell. In each cell, sequentially received coefficients are first used for computation and then transferred by the transfer circuit with a suitable delay. A logic device controls the time distribution and repetition of the real and imaginary parts of the input data. The cells alternately perform partial computations on the real and imaginary parts; the results, with a corresponding validations signal, are pooled by a pooling circuit and applied to a common results-framing and rounding circuit.

6 Claims, 6 Drawing Sheets

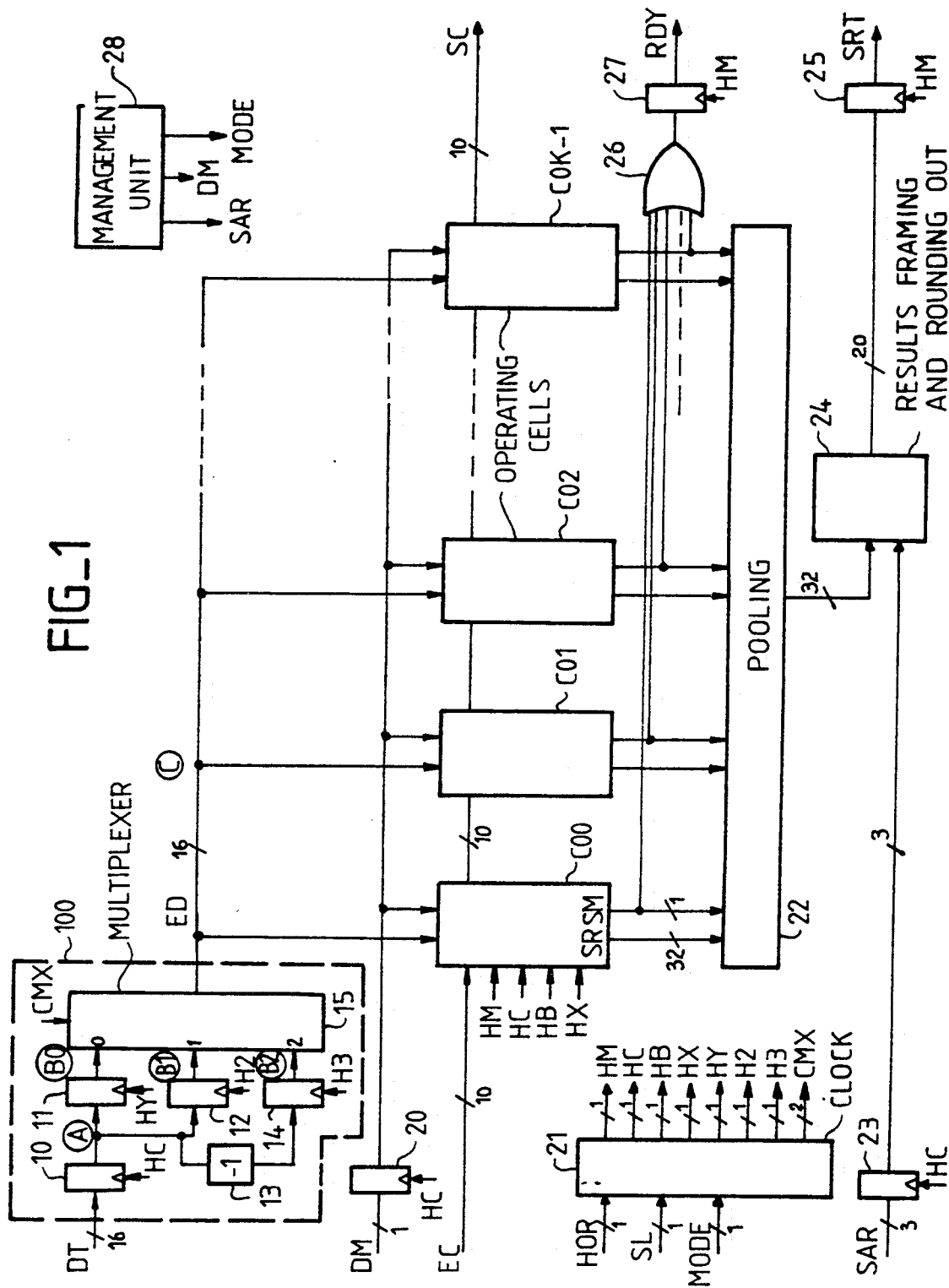
FIG_1

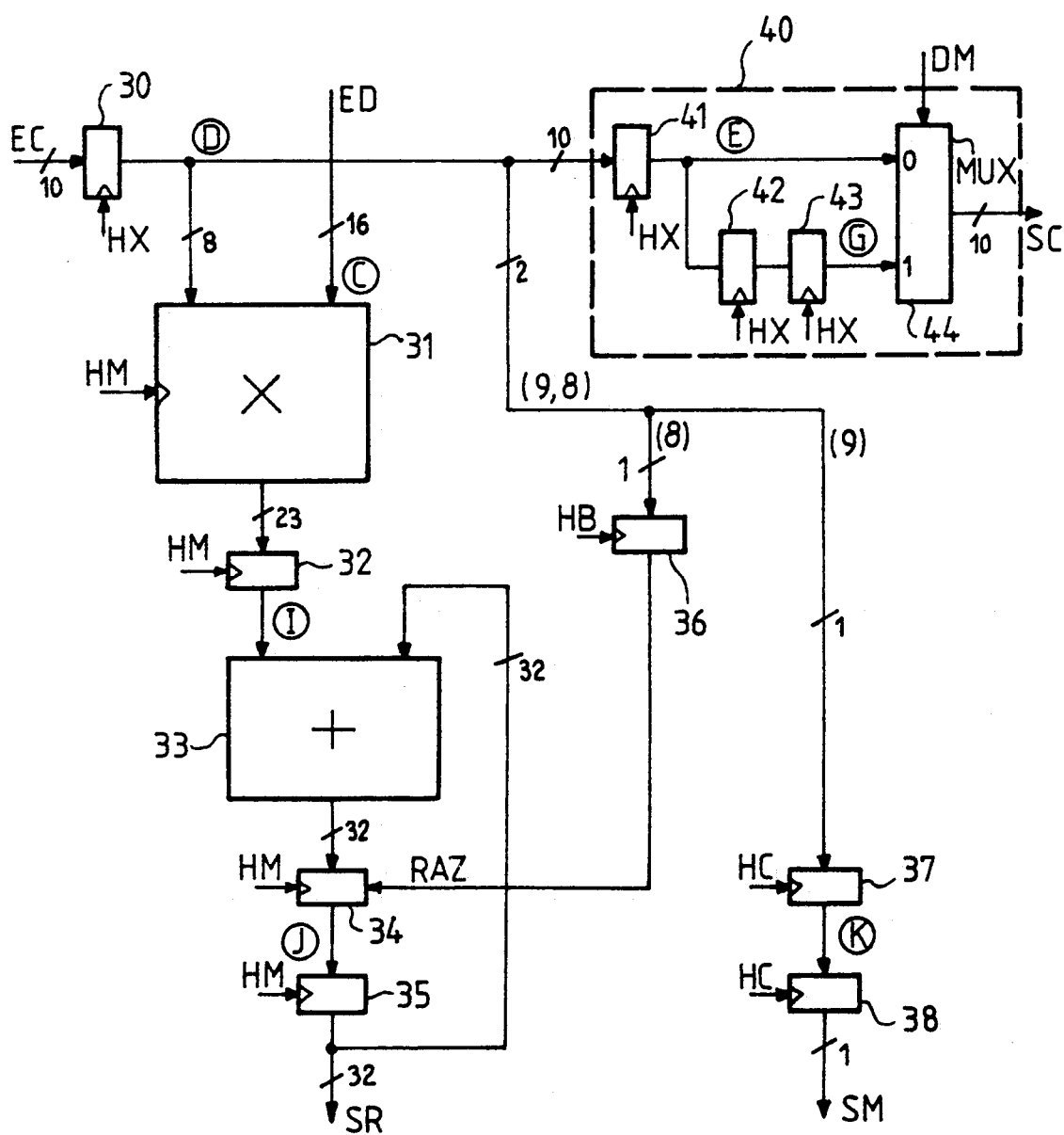
FIG_2

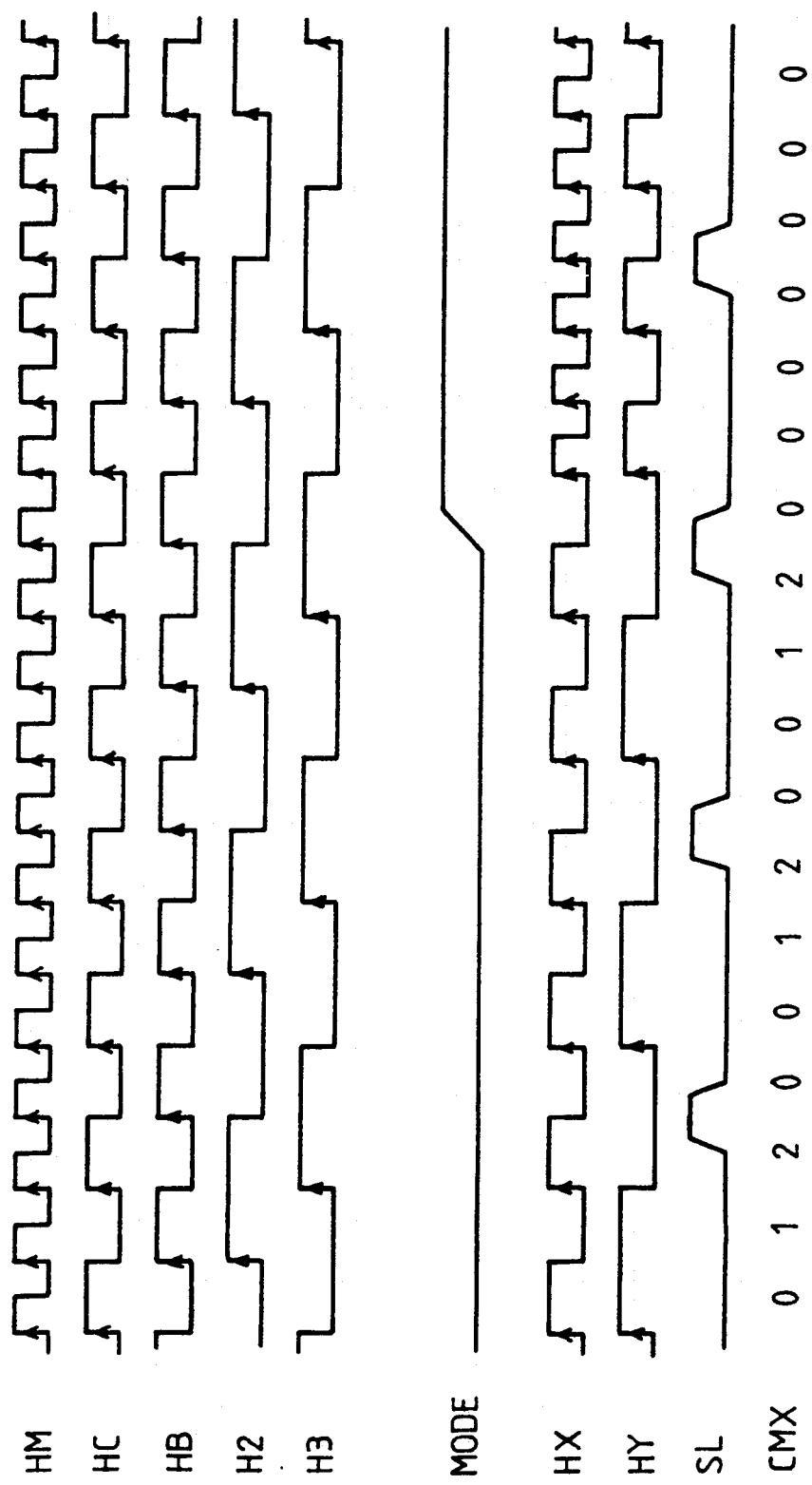
FIG_3

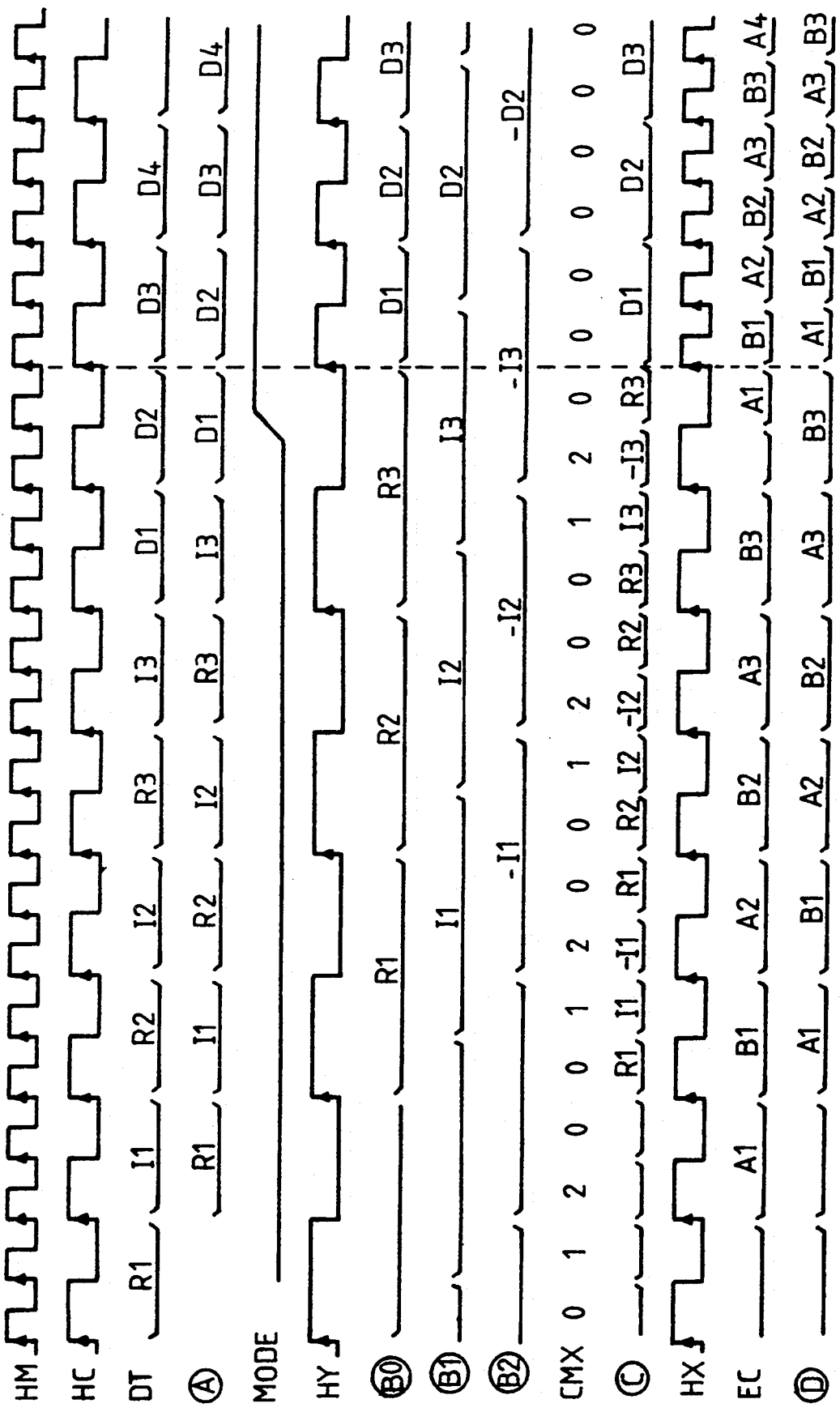
FIG_4

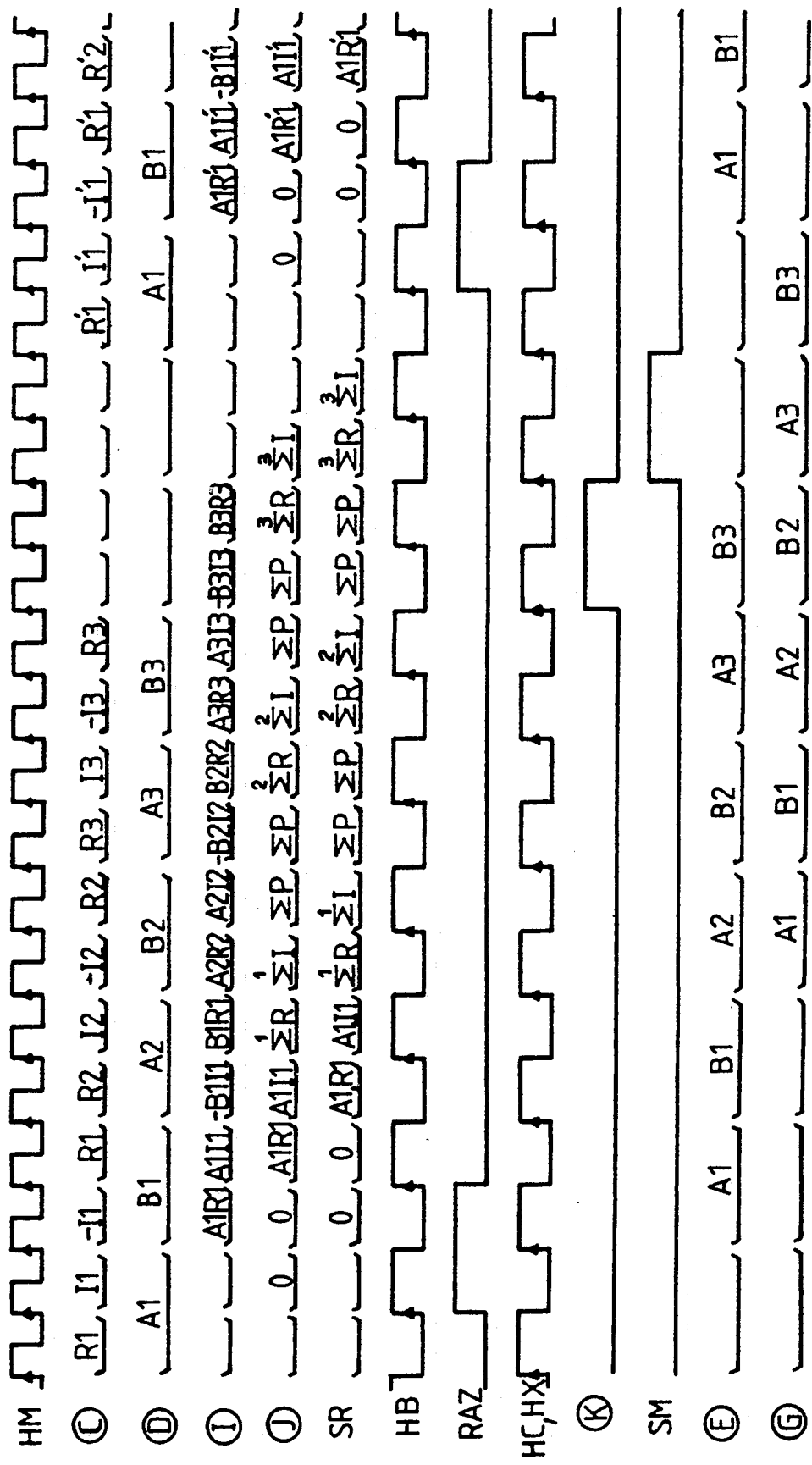
FIG_5

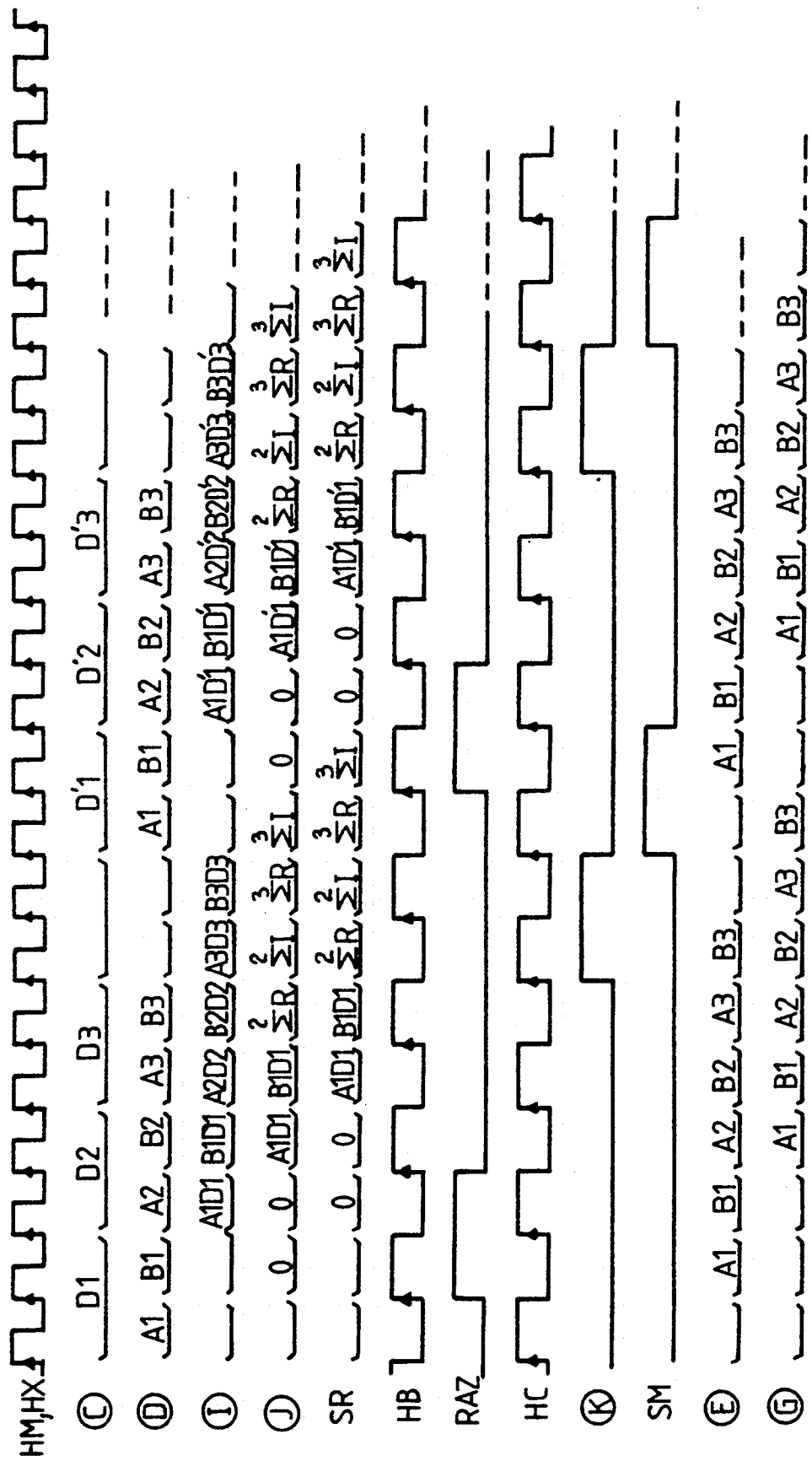
FIG_6

DIGITAL COMPUTATION INTEGRATED CIRCUIT FOR CONVOLUTION TYPE COMPUTATIONS

BACKGROUND OF THE INVENTION

1. Field of the Invention

The present invention relates to a digital computation integrated circuit designed, notably in digital signal processing, for convolution type computations of the form $$\sum_i C_i X_j$$

with $j=i+k$, j and k being relative integers and i being a natural integer, where $C_i$ represents complex coefficients and $X_j$ represents either complex or real data.

2. Description of the Prior Art

There are numerous applications implementing computations of this type, for example in the processing of radar signals and, more especially, for digital pulse compression and digital amplitude/phase demodulation.

There are known signal processing integrated circuits which perform similar computations. This is the case, for example, with the signal processor IMS A100 by the firm INMOS. This circuit is an operator block essentially comprising a multiplier accumulator which can be used as a construction block for different applications and can be easily cascade-connected.

However, the disadvantages of this prior art circuit are, firstly, limited computation power which is insufficient for certain applications and, secondly, the fact that it cannot be directly adapted to the processing of complex values. For it to be possible to accomplish a processing operation of this type, it is necessary to provide for ancillary circuits: this increases costs and, to a certain degree, it damages performance characteristics.

SUMMARY OF THE INVENTION

An object of the invention, therefore, is to overcome these drawbacks by providing for an integrated circuit which can perform computations on complex values and which can be easily cascaded.

According to the invention, there is provided a digital computation integrated circuit designed, notably in digital signals processing, for convolution type computations of the form $$\sum_i C_i X_j$$

with $j=i+k$, j and k being relative integers and i being a natural integer, where $C_i$ represents complex coefficients and $X_j$ represents either complex or real data said circuit comprising a plurality of operating cells, which simultaneously receive the input data, each operating cell including a multiplier followed by an adder accumulator, so that each operating cell performs the computations corresponding to a different value of k, each operating cell having a second register, inserted in the loop of the adder accumulator, after the accumulator register, to provide for the alternative processing, at the clock signal rate, of the real and imaginary portions of the computation, wherein the real and imaginary parts of each coefficient are sent subsequently to the first operating cell where they are, firstly, applied to an input of the multiplier and, secondly, retransmitted with a suitable delay to the following cell, said coefficients being thus propagated from each cell to the next one, and wherein said circuit further has a logic device receiving the data and different clock signals to ensure the time distribution and repetition of the real and imaginary parts of said data towards the operating cells so as to enable the multipliers of each cell to successively and alternatively provide the real and imaginary partial products of the computation.

Through its architecture, a circuit of this type can be cascade-mounted, thus making it possible to achieve very great convolution depths. The propagation of the coefficients from one cell to the next one enables a notable reduction in the latency time between outputs of validated results: this means shorter response times. This architecture therefore provides for instantaneous switching-over from one type of code to another and, hence, provides for adaptive processing with improved performance characteristics.

BRIEF DESCRIPTION OF THE DRAWINGS

The invention will be better understood and other features and advantages will emerge from the following description and the appended drawings, of which:

FIG. 1 is a block diagram of the circuit according to the invention;

FIG. 2 is a diagram of an operating cell of the circuit according to the invention;

FIG. 3 shows graphs of clock signals and control signals used in the circuit of FIG. 1;

FIG. 4 shows graphs of inputs of coefficients and data which are either complex or real;

FIG. 5 shows the graphs of signals at various points of the circuit in the case of complex data and FIG. 6 shows graphs of signals at the same points of the circuit in the case of real data.

DESCRIPTION OF PREFERRED EMBODIMENTS

FIG. 1 is a general block diagram of the circuit according to the invention. This circuit chiefly comprises K identical operating cells, COO to COK-1 These cells are parallel-connected to the data input receiving the data DT, through a logic device 100 which provides for the distribution of data in time and, if necessary, for the repetition of data, as shall be seen below.

The complex coefficients $C_i$ are sent through the input EC to the first cell COO where they are used and retransmitted with a suitable delay to the following cell CO1 and so on. The coefficients are therefore propagated from one cell to the next until the output ST.

Each cell essentially has a multiplier and an adder accumulator to achieve the computation $$\sum_i C_i X_j$$

for a given value of k $(j=i+k)$ increasing from one cell to the next one.

The results are given at the output SR of the cell, and the final result is present at this output when a validation signal is present at the output SM of the cell. The results given by all the cells successively are pooled by a pooling circuit 22, controlled by the validation signals of the various cells. This circuit 22 therefore provides the sequence of validated results to a results framing and rounding circuit 24 which selects the framing of the results under the control of a signal SAR, depending on the integration gain envisaged, i.e. depending on the number of elementary multiplications performed in a cell. The signal SAR is transmitted to the circuit 24 by means of a transfer register 23 controlled by a clock signal HC. The framed and rounded results are transmitted to an output SRT by means of a transfer register 25 controlled by a clock signal HM. To enable the cascade connection of several circuits according to FIG. 1, a "results output ready" signal is given by the output RDY. This signal is active for as long as results come out at the output SRT. This signal is the output signal of an OR gate 26, receiving the validation signals of the outputs SM of all the operating cells, the output signal of the OR gate being transmitted by means of a register 27 controlled by the clock signal HM.

An input DM enables the application of a decimation signal to the circuit according to the invention by means of a register 20 controlled by the clock signal HC. For, in certain cases, the furnishing of results corresponding to all the points of the computation may amount to an excessive load for the using circuits which follow. To adapt this load without losing precision and without the circuit of the invention having unused elements, it is provided that the delay in transmission of the coefficients from one cell to the next one will be brought into play so as to eliminate one out of two computation points. This is got by applying the decimation signal in parallel to all the operating cells, as shall be seen below in relation to FIG. 2.

A clock circuit 21 gives the different signals needed, under the control of a mode signal (complex data mode or real data mode). This clock circuit is synchronized by external signals HOR (base clock) and SL (slow synchronization). The control signals SAR, DM and MODE are given, for example, by a management unit 28.

Finally, the logic device 100 has transfer registers 10, 11, 12, 14, respectively controlled by the clock signals HC, HY, H2, H3, a circuit 13 for multiplication by −1 and a three-input multiplexer 13 controlled by a signal CMS.

FIG. 2 shows the diagram of an operating cell. A cell of this type essentially has a multiplier 31, controlled by the clock signal HM, an adder 33, an accumulator register 34, controlled by the clock signal HM, and a second register 35, controlled by the same clock signal HM, which is inserted after the register 34 in the loop of the accumulator register. A register 32, controlled by the clock signal HM is inserted herein between the multiplier and the adder. Of course, this register could be eliminated or placed within the multiplier 31. It is also possible to have several similar registers inside the multiplier 31 and the adder 33 (to enable pipeline processing). The inputs of the multiplier 31 receive, firstly, the data ED transmitted by the logic device 100 (FIG. 1) and, secondly, through a register 30 controlled by the clock signal HX, the coefficients coming from the input EC. The output SR of the cell is formed by the output of the register 35.

In fact, the bus for the transmission of the coefficients coming from the input EC has two additional conductors. Thus, this bus comprises, for example in the instance shown, eight conductors to transmit eight bits representing the value of the coefficient, and two additional conductors respectively transmitting one resetting bit RAZ (bit 8) and one bit (bit 9) enabling the preparation of the results validation signal.

The bits 0 to 7 are therefore applied to the multiplier 31, the bit 8 is applied as a resetting signal RAZ of the register 34, by means of a register 36 controlled by the clock signal HB, and the bit 9 forms the validation signal at the output SM, after passing through two successive registers 37 and 38 controlled by the clock signal HC.

Furthermore, the coefficients and the two additional bits are transferred to the output SC by means of a transfer circuit 40, controlled by the decimation signal DM. This transfer circuit has an input register 41, controlled by the clock signal HX, and a multiplexer 44 with two inputs, of which one (reference 0) is directly connected to the output of the register 41 and the other (reference 1) is connected to the register 41 by means of two series-connected registers 42 and 43, controlled by the clock signal HX. The multiplexer 44 is controlled by the decimation signal DM.

The working of the unit shall be explained with reference to FIGS. 1 and 2, and also to the signals represented in FIGS. 3 to 6, which show signals at different points of the circuit identified by encircled letters.

The working is based on the standard factorization:

$$\sum_i C_i X_{i+k} = \sum_i (A_i + jB_i)(R_{i+k} + jI_{i+k}) \qquad (1)$$

$$= \sum_i [A_i R_{i+k} - B_i I_{i+k}] + j \sum_i [A_i I_{ik} + B_i R_{i+k}]$$

and on the alternative use of the multiplier and the adder accumulator of each cell for the computation and addition of the respectively real and imaginary partial products respectively.

FIG. 3 shows the different clock signals and the control signal CMX as a function of the state of the signal MODE. The signals HM, HC, HB, H2, H3 always have the same frequency irrespectively of the state of the signal MODE.

This signal is at the low state when the pieces of data given at the input DT of the circuit are in complex form, and is in the high state when these pieces of data are real.

The clock signals HX and HY have a doubled frequency when these pieces of processed data are real.

The signal SL is a so-called slow synchronization signal which gives the synchronization of successive incoming data, the input DT successively receiving the real part and then the imaginary part of each piece of data if these pieces of data are complex and each piece of data successively if these pieces of data are real.

The two-bit signal CMX is such that, for each complex piece of data, the multiplexer 15 successively selects its inputs 0, 1, 2 and 0 and that, for real data, the input 0 is constantly selected.

FIG. 4 shows the graphs of the inputs of coefficients and data which are either complex or real. This FIG. again shows the clock signals HM, HC, HY, HX, the signal MODE and the control signal CMX.

In the case of complex data, the input DT successively receives the real and imaginary parts of each piece of data R1, I1, R2, I2 . . . at a rate which is half that of the frequency of the clock signal HM and in phase with the clock signal HC. At the point A, after passing into the register 10, the same values are found shifted by a period of the clock signal HC.

In BO, after passing into the register 11 controlled by the clock signal HY, the period of which is twice that of HC, only the real successive parts R1, R2 . . . are formed. In D1, after passing into the register 12, controlled by the clock signal H2 with the same period as HY but shifted by a period of HM, only the successive imaginary parts I1, I2 . . . are found again. In B2, after going through the register 10, the same values are found again, shifted by a period of the clock signal HC.

In BO, after going through the register 11, controlled by the clock signal HY, the period of which is double that of the clock signal HC, only the successive real parts R1, R2 . . . are found again. In B1, after passing through the register 12, controlled by the clock signal H2, with the same period as HY but shifted by one period of HM, only the successive imaginary parts I1, I2 . . . are found again. In B2, after going through the multiplier by $-1$ (reference 13) and the register 14, controlled by the clock signal H3 with the same period as H2 but shifted by a period of HM, only the successive values $-I1, -I2 \ldots$ are found again.

The pieces of data ED at the point C are thus formed by succession R1, I1, $-$I1, R1, R2, I2, $-$I2, R2 . . . at the rate of the clock signal HM.

Besides, the coefficients applied to the input EC are found again at the point D at the rate of the clock signal HX(=HC), in the form of a succession of real and imaginary parts A1, B1, A2, B2 . . . .

On the contrary, in the context of real data (right hand part in FIG. 4), the clock signals HY and HX have a doubled frequency and the input 0 of the multiplexer 15 is constantly selected. Thus, at the point C, the succession of real data D1, D2 . . . is found again at the rate of the clock signal HY(=HC) and, at the point C, the succession of real and imaginary parts of the coefficients A1, B1, A2, B2 . . . is found again at a double rate, namely that of the clock signal HX(=HM).

FIG. 5 shows the graph of signals at various points of an operating cell, for example the first cell COO, in the case of complex data. The multiplier 31, working at the rate of the clock signal HM, successively and alternately gives (point I) the partial products for obtaining the real and imaginary parts of the computation according to the relationship (1). To enable this to be obtained, the partial products of the real parts, namely every other partial product, and the partial products of the imaginary part have to be added together. In other words, these operations have to be performed in imbricated form. This is achieved by means of the register 35 which adds a delay of one period of the clock signal HM to the loop of the adder accumulator. At the points J and SR in the graphs $\Sigma R$ designates the sums of real parts and $\Sigma I$ designates the sums of significant imaginary parts, namely parts corresponding to complete stages of the computations the digit above the sign $\Sigma$, corresponding to the number of the step, and P designates all the intermediate sums of no significance. It is seen that the final result, herein $$\overset{3}{\Sigma} R \text{ and } \overset{3}{\Sigma} I,$$

appears at the output SR two periods of the clock signal HC after the appearance of the imaginary part B3 of the last coefficient at the point D. The result validation bit (bit 9) is sent at the same time as this imaginary part B3 to the coefficients bus, and it is delayed by two periods of HC within the cell, by means of the registers 37 and 38.

Similarly, the resetting signal RAZ of the register 34 should occur just before the recording, in this register, of the first partial product A1R1. The bit 8 controlling this resetting signal is therefore sent at the same time as the real part A1 of the first coefficient and is synchronized inside the cell with the clock signal HB by means of the register 36.

The coefficients and the additional bits are transmitted to the output SC and, therefore, to the following cell, by the transfer circuit 40 (see graphs at E and G of FIG. 5).

If the system is in normal operation, without decimation, the multiplexer 44 selects its output 0 (FIG. 2). The coefficients are applied to the input of the multiplier 31 of the following cell CO1 with a delay of two periods of the clock signal HX with respect to the point D of the cell COO, owing to the register 41 of the circuit 40 and the register 30 of the following cell. This cell will therefore perform the computation $$\sum_i C_i X_{i+k}$$

for the value $k=1$ and so on for the different cells. Through this propagation of coefficients from one cell to the next one during the computation, a great reduction is got in the idle time between valid results, due to the latency period of the circuits (i.e. the time between the input of the coefficients and the beginning of the output of the valid results). This is a very great advantage in achieving adaptive processing operations with shorter response times.

If the decimation signal DM is active, the multiplexer 44 selects its input 1. The coefficients are applied to the input of the multiplier 31 of the following cell CO1 with a delay of four periods of the clock signal HX with respect to the point B of the cell COO, because of the registers 41 to 43 of the circuit 40 and the register 30 of the following cell. The cell CO1 will therefore perform the computations $$\sum_i C_i X_{i+k}$$

for the value $k=2$, and not $k=1$ as earlier. Thus, the operating cells perform the computations for the value of k increasing by twos and not for all the values of k. Hence, the number of valid results to be processed by the user circuits is divided by two. This decimation is performed without there being any unused cells and without reducing the number of coefficients and pieces of data used.

The decimation is therefore done without any reduction in precision in the computations on the points preserved.

FIG. 6 shows the graphs of signals at various points of an operating cell, for example, the first cell COO in the case of real data. Through the multiplication by two of the frequencies of the clock signals HY (acting on the transfer of data to the input 0 of the multiplexer 15 in the logic device 100 of FIG. 1) and HX (acting on the input of coefficients in each cell) and through the constant selection of the input 0 of the multiplexer 15 coincidence is obtained, in time, between each successive piece of data and the real and imaginary parts of a corresponding coefficient. The operation of each cell is the same as that previously indicated with reference to FIG. 5. Thus, without any major modification except for a matching of the clock circuit 21 with the command MODE, which is obvious to those skilled in the art, the circuit according to he invention can process real as well as complex data.

It must be noted that, in the digital computation circuit according to the invention, owing to the propagation of coefficients from one operating cell to the next one, the results coming from each operating cell are present sequentially at the inputs of the pooling circuit 22 whch does not need to be a multiplexer but rather a simple set of gates, controlled by the validation signals of the outputs SM of the cells. This appearance in time sequence of the results at the output of the circuit 22 has the advantage of enabling the use of only one results framing and rounding circuit 24 (and not one circuit per cell). As already indicated, the framing of the results is controlled as a function of the number of multiplications performed by each cell, namely the number of coefficients and pieces of data used for the computation in a cell. These parameters are determined in advance, and the managing unit 28 can therefore give a control signal SAR, which herein has three bits. The circuit 24 is used to go from results given, for example, on thirty-two bits, to rounded results given, for example, on twenty bits.

As can be seen, the digital computation circuits according to the invention can be cascaded without difficulty, by means of the outputs SC, RDY and SRT. It is therefore easily possible to achieve very great depths of convolution. The transmitting, at the same time as the coefficients, of the control signals of the operating cells through two additional conductors of the coefficients bus, gives an extremely simplified system for the validation of results and for resetting.

It is clear that, since the operation is done on complex values, the computation circuits should be synchronized with respect to the real part/imaginary part pairs of the input values. This is accomplished through the slow synchronization signal SL which synchronizes the clock circuit 21.

Of course, the described embodiment in no way restricts the scope of the invention and, in particular, the numbers given in the connections of the different figures are given purely as examples.

What is claimed is:

1. A digital computation integrated circuit for convolution type computations of the form $$\sum_i C_i X_j$$

with $j = i + k$, j and k being integers and i being a natural integer, where $C_i$ represents complex coefficients having a real and an imaginary part and $X_j$ represents either complex or real input data, respectively corresponding to a complex data operating mode of said integrated circuit, wherein said input data have a real and an imaginary part, and to a real data operating mode of said integrated circuit, wherein said input data have only a real part, said circuit comprising:

a plurality of operating cells connected to each other in a sequence and which simultaneously receive the input data, a propagation bus for sending in succession the real and imaginary parts of each coefficient $C_i$ to a first of said operating cells in said sequence, each of said cells including:

(a) a multiplier having an output connected to an adder accumulator comprising an adder and an accumulator register connected to form a loop, whereby each operating cell performs computations corresponding to a different value of k, (b) a second register, inserted in the loop of said adder accumulator, after said accumulator register, to provide for alternative processing, at a clock rate, of real and imaginary portions of the computation, said second register providing output results of said each cell for computations corresponding to said value of k, and (c) means for transferring, on said propagation bus, real and imaginary parts of coefficients received thereon by that cell, to a next cell in said sequence; whereby in each cell, the real and imaginary parts received on said propagation bus are, firstly, applied to an input of the multiplier of that cell and, secondly, retransmitted, by the transferring means of that cell, with a suitable delay, to the next cell, said coefficients thus being propagated from one cell to the next; and logic means for receiving clock signals and said input data and for ensuring time distribution and repetition of said real and imaginary parts of said input data on a data bus towards said operating cells whereby said each cell is enabled to successively and alternatively provide real and imaginary partial products of the computation.

2. A digital computation integrated circuit according to claim 1, wherein said bus for the propagation of coefficients has a first additional wire and a second additional wire, the first additional wire transmitting, to each cell, a resetting bit for said accumulator register and the second additional wire enabling each cell to prepare a signal for validating the results of the computations by said each cell.

3. A digital computation integrated circuit according to claim 1, wherein said circuit further has a circuit for pooling the results of the computations by said operating cells, controlled by the corresponding validating signals, and a single results-framing and rounding circuit receiving successively, from said pooling circuit, the results from the various cells and being controlled by a control signal generated as a function of the characteristics of the computation performed by the cells.

4. A digital computation integrated circuit according to any one of the claims 1 to 3, wherein said logic device has a three-input multiplexer having a first, second, and third, input, and transfer registers respectively connected to said inputs of said multiplexer and controlled by respective clock signals, and a circuit for multiplication by −1 to transfer, in the case of complex data, the real parts, the imaginary parts and opposite of the imaginary parts, respectively, of said input data to the three inputs of said multiplexer, said multiplexer being controlled by a control signal selecting, for each piece of input data, said first, second, third and then said first input successively, and wherein, in the case of real data, the control signal of said multiplexer always selects said first input.

5. A digital computation integrated circuit according to claim 1, wherein each said transferring means is controlled by a control signal to ensure either a normal transfer of the coefficients so that the computations are performed for all successive values of k or the transfer of the coefficients with a pre-defined delay so that the computations are performed only for every other value among said successive values of k.

6. A digital computation integrated circuit according to claim 4, wherein said clock signals with respective predetermined frequencies are provided to the different parts of said digital computation integrated circuit by a clock circuit comprising means for modifying the frequency of some of said clock signals, depending on whether the operating mode of said integrated circuit is said complex data mode or said real data mode, said clock signals of modifiable frequency being addressed, firstly, to said transfer registers at the first input of the multiplexer of said logic device and, secondly, to said transferring means of each of said operating cells.

* * * * *